Oct. 18, 1932.  R. WELCKER  1,883,190
FLOW GOVERNOR
Filed May 25, 1928  3 Sheets-Sheet 1

Oct. 18, 1932.                R. WELCKER                1,883,190
                              FLOW GOVERNOR
                           Filed May 25, 1928        3 Sheets-Sheet 2

Oct. 18, 1932.          R. WELCKER                1,883,190
                       FLOW GOVERNOR
              Filed May 25, 1928        3 Sheets-Sheet 3

INVENTOR.
Rudolph Welcker
BY Chapin & Neal.
ATTORNEYS.

Patented Oct. 18, 1932

1,883,190

UNITED STATES PATENT OFFICE

RUDOLPH WELCKER, OF SPRINGFIELD, MASSACHUSETTS, ASSIGNOR OF ONE-FOURTH TO FRANKLIN G. NEAL, OF SPRINGFIELD, MASSACHUSETTS

FLOW GOVERNOR

Application filed May 25, 1928. Serial No. 280,577.

This invention relates to a governor for automatically controlling the flow of a liquid or gas in a pipe line or conduit. The features of invention will be clear from a description of a preferred embodiment shown in the drawings and a consideration of its operation.

Figure 1:
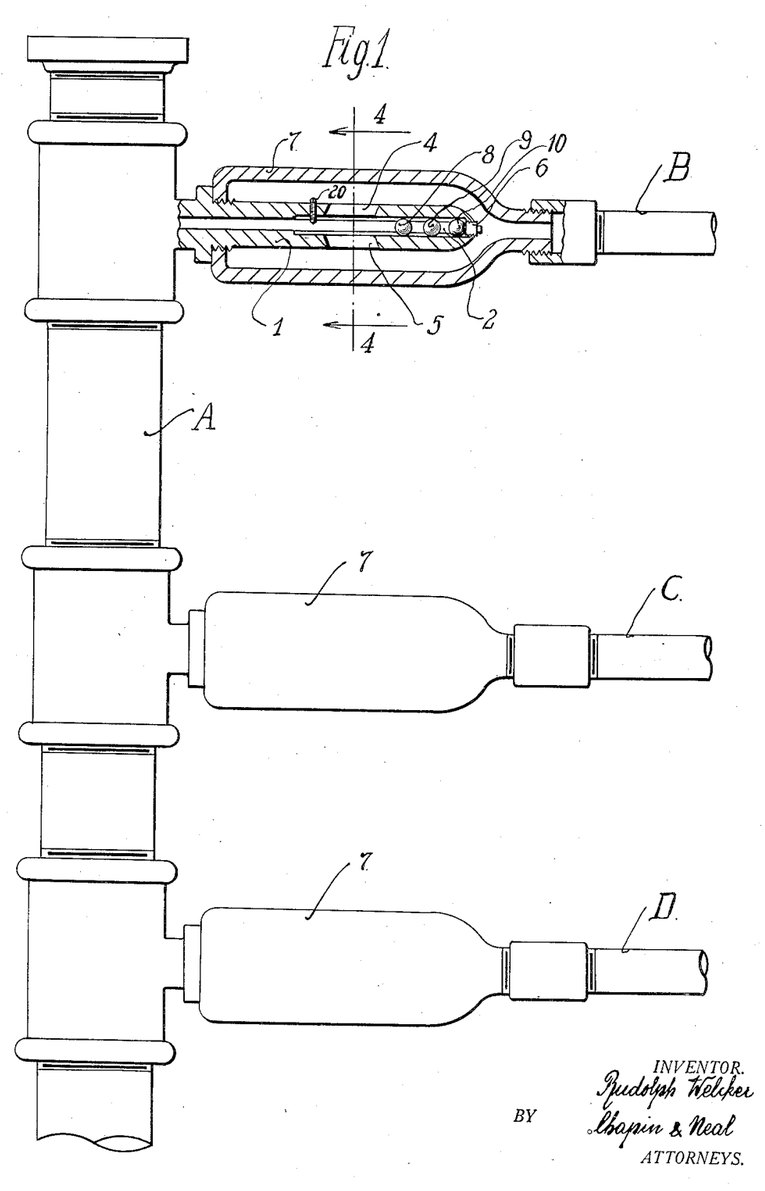
Fig. 1 is a view showing a pressure line A connected to three branch lines B, C, and D, each connection being through the flow governor and one of the latter being shown in section.
Figure 4:
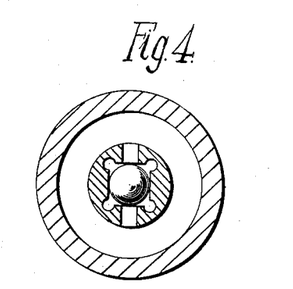
Fig. 4 is a section on line 4—4 of Fig. 1.

Referring to Fig. 1, a T-connection is shown for pipe B to connect with pipe A. The stem of the T-connection is made into a casing 1. A second casing 7 is removably mounted on casing 1 and is connected to pipe B. These casings provide two concentric chambers, an inner one having direct passage from pipe A and an outer one having direct passage to pipe B. The chambers communicate through radial ports 4 and 5 in casing 1. The inner chamber has a dead end pocket 2 which may be opened by removable plug 6. A bleed hole may be provided in plug 6 if desired. This pocket 2 and that part of the chamber from which ports 4 and 5 extend has a cross section as shown in Fig. 4. Three metal balls 8, 9, and 10 are inserted in pocket 2. Each of them has a diameter just a little less than the cross dimensions between the flat walls of the inner chamber. The balls are loose in the chamber so as to move easily from pocket 2 into overlapping relation with ports 4 and 5. These ports extend from the center lines of the flat walls. When one of the balls overlaps ports 4 and 5, its circumference extends transversely of the ports. As the ball moves toward pipe A it acts somewhat as a slide valve closing member since less and less of the port area is exposed for free passage from pipe A to pipe B.

A stop pin 20 may be provided if desired, so as to limit the movement of ball 8 toward the opening from pipe A.

The operation of the structure will now be described but first with relation to its operation with one ball in pocket 2. Fluid or gas, hot or cold, may flow from pipe A to pipe B through the governor casing. A normal velocity through the casing will keep the ball 8 in pocket 2 where it is idle and does not function. Thus a normal velocity gives the fluid a clear passage through ports 4 and 5 regardless of the pressure head of the line. When and if a flow starts from pipe A to pipe B greater than the normal velocities, the governor immediately starts to function.

The increased energy due to dynamic pressure from the flow is applied directly on the front surface of ball 8. This curved surface causes the flow to be directed around the ball and between the ball and the walls of pocket 2. The flow is divided somewhat the same as the pointed prow of a ship divides the water so there will be less pressure retarding the desired relative movement between the two. This idea of the curved surface of the ball is important but the particular curve is of secondary importance. It might be cone shaped or wedge shaped or any shape that will cause the dynamic pressure to have less resultant force on the surface of the object in pocket 2 than it would have if such surface were at right angles to the direction of flow. In the manner stated the flow is divided and one part exerts hydraulic pressure on the contents of the dead end of pocket 2 where the dynamic pressure of the flow becomes static pressure. The latter is then exerted on the rear face of the ball 8. The other part of the flow is deflected radially towards the ports 4 and 5.

I use static pressure as a convenience, whereas back pressure might be more accurate. The pressure back of the ball if fully considered would probably present a complex situation. There is probably a surging of the fluid into eddies and a resultant effect due to the compression back of the ball and the pressure around the ball which causes the compression. Whatever a true description of the back pressure is, it nevertheless results in a tendency for the ball to move out of its closed pocket and directly against the dynamic pressure of the flow. A simple demonstration is possible with a glass test tube having a couple of marbles at the bottom almost but not quite of the same diameter as the tube. If one blows into the tube with a soda water straw, the top marble will lift against gravity. A good hard blow will lift both balls. This is true whether air is blown in or the tube filled with water and water blown in through the straw. The compressibility of the fluid is not essential. The term static pressure is used herein instead of back pressure because the word static gives a good contrast to the word dynamic, and the pressures are in fact different in character and subjected to different influences due to the design of the governor.

For the purpose of understanding the functional relationship of the parts shown, the structure of Figure 1 is considered as if only one ball 8 were in pocket 2 instead of three balls 8, 9, and 10, as shown. The subsidiary advantage of balls 9 and 10 will be discussed later. It will be clear that the value of the dynamic pressure on the front of ball 8 and the value of the static pressure on the rear of the ball will each depend on the velocity of flow through the governor. The ball 8 will move into the pocket 2 when the excess value is on the dynamic side and out of pocket 2 when on the static side, and balance when the values are equal. As the flow enters the inner casing of the governor and leaves through ports 4 and 5, the ball 8 in pocket 2 acts somewhat like the pellet in a policeman's whistle. If the flow velocity is high enough, ball 8 moves to ports 4 and 5. When it overlaps these ports the static pressure back of the ball drops in value and the ball darts back to pocket 2. The action is like the trill-making element in the whistle and the movement is dependent on the velocity of the "blow". In my governor, as in a whistle, the action of ball 8 (like the whistle pellet) is dependent on the passage of the flow through ports 4 and 5 (like the side air passage in the whistle) and the pressure set up by the flow in pocket 2 (like the pressure in the dead end extension of the whistle) is dependent on the "blow" towards the pocket.

I use the whistle analogy as a convenient one because the action of a single ball in my governor is like the whistle action except that in my case the ball is primarily designed to regulate the velocity of flow, and not to produce sound. When ball 8 reaches ports 4 and 5 it momentarily retards the flow. If the governor is so designed (like a whistle) that ball 8 has a rapid oscillating movement to and from retarding position with respect to ports 4 and 5, the velocity flow through the ports will be retarded as a result of the rapidly repeated momentary retardations. The area of the ports 4 and 5 will have a distinct influence on the effect, as pointed out below, and they can be readily designed for the "whistle effect" for flow retarding purposes. The effect of the primary retarding arrangement can be extended as follows:

To extend the advantages of this flow retarding arrangement I use, instead of one, a plurality of balls. The three balls 8, 9, and 10, as shown, work together. The dynamic flow pressure, however, remains on the front face of ball 8. The movement of the balls in this case is now dependent on the difference between the dynamic pressure on ball 8 and the static pressure on the rear of ball 10 which remains available over the full range of travel. The static pressure on the rear of ball 10 will be available after that on ball 8 is lost through ports 4 and 5, and while the dynamic pressure is still on the front face of ball 8 as the balls move forward. These are the more important factors involved in the movement which takes place.

When ball 8 moves into overlapping or retarding position with respect to ports 4 and 5 the whole of the static pressure which may be causing the movement is not quickly lowered through ports 4 and 5 as in the case of the single ball. It is still applied as a working pressure back of ball 10 which has not reached the ports. The balls 8, 9, and 10 may be kept in movement until the dynamic pressure and the static pressure causing the movement are balanced. In any continued movement toward pipe A, ports 4 and 5 are being cut off somewhat like a port by its slide valve, but in this case may be considered rather as in an obstructing relationship to the flow, than in, an exact cut-off relationship like a valve port cut-off would be. The velocity of flow is effectively lowered by such forward movement of the balls. In this manner the retarding effect of ball 8 is extended by the additional balls. As balls 8, 9, and 10 all move toward pipe A and as each may overlap ports 4 and 5, the retarding effect on the flow velocity is greatly increased as compared to the action of a single ball operating alone. It is only when ball 10 has its rear face over the ports 4 and 5 that all balls 8, 9, and 10 give their maximum retarding effect. Before this happens ball 8 has retarded the velocity flow through the ports to a very substantial extent as it has moved toward pipe A. In addition the arrangement of the three balls has a decided effect in cutting down the tendency towards rapid oscillating movements of ball 8 (the whistle effect) or preventing it altogether.

The showing and description of balls 8, 9, and 10 are in their loose independent condition in pocket 2 with relation to ports 4 and 5. It may be desirable in some cases to connect the balls 8, 9, and 10 so that they must all move together when one moves. This can be done by any suitable open-work cage and preferably a cage like a ball bearing cage such as used to space the balls in a ball bearing structure in which the anti-friction movement is possible and the balls roll with respect to the cage but are nevertheless connected to all move together. When this is done it is seen that all pressures or effects on one ball in my governor will take part in the resultant effect of the balls' movements together.

As the velocity changes the position of the balls with respect to ports 4 and 5 will be changed and thus the flow is governed automatically. Furthermore, the governing action is practically instantaneous and frictionless. It follows tendencies in the stream flow velocity.

The use of balls is preferred on account of their anti-friction character. If friction be disregarded or otherwise provided for than by the ball devices, various specifically different means can be substituted for any ball arrangement. For example, a cylinder of proper length, of about the same diameter as the balls, and with a cone shaped front end could be placed in pocket 2, with substantially the same functional relationship to ports 4 and 5 as the balls have.

As stated, the size and shape of ports 4 and 5 (or one of them if only one is used) has a relation to the effects desired. For example, it can be readily seen that if these ports were made so large that the flow through them could take place without effecting the movement of the balls the governor would not work. Just as in a whistle, if the side opening is large enough the trill-making element in the dead end extension would not vibrate. If on the other hand the ports 4 and 5 were made very small, the static pressure in pocket 2 might be sufficient to hold the balls in extreme retarding position all the time. Between these two extremes there is a size for the ports that will cause a variation in the position of the balls with relation to the ports according to the velocity of flow through the governor. And the position of the balls may be thus automatically changed to control excess velocity in the manner described.

This desirability of the proper size for ports 4 and 5 may be taken care of by designing the flow governor for its particular flow condition. Or the governor may be made adjustable to accommodate different conditions of flow. One manner of adjustment is shown in Fig. 2.

A sleeve 11 is mounted to slide lengthwise and also turn frictionally on the outside of the inner casing. The development of the sleeve in Fig. 3 illustrates the way various sizes and shapes of port openings may be imposed on ports 4 and 5. Sleeve 11 extends outside of the outer casing through a packing device 15 and has hand wheel 16 on it by which any of the openings shown in Fig. 3 can be registered with port openings 4 and 5. In this figure the inner casing has a closing plug 13 with an adjusting bolt 14 extending beyond the outer casing 17 to limit the rearward movement of the balls. The casing 17 is arranged with its outlet passage at one side for convenience.

By using the described adjustable governor in a pipe line the automatic control of the flow velocity may be changed through a wide range. That is, it can be set to automatically work to hold the flow velocity below one value and then adjusted to hold it below another value.

Figure 2:
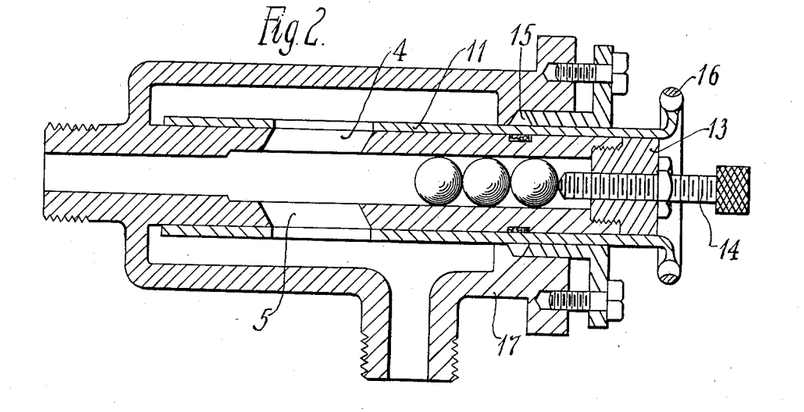
Fig. 2 is a sectional view of the flow governor having features of adjustment not shown in the form of the invention in Fig. 1.
Figure 3:
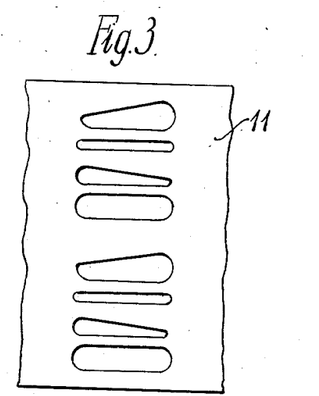
Fig. 3 is a development of the port adjusting sleeve to indicate the variety of adjustments that may be made in the structure of Fig. 2.

Since the governor of Fig. 2 can be adjusted during the flow through the governor, it may be used to determine the character of port openings that will give the desired effect in any particular line under any particular conditions through a very wide range. This feature is of considerable secondary value as it is frequently better practice to test a particular line for its requirements than to design a fixed governor like that of Fig. 1 from mathematical considerations alone. This is of especial importance if the flow supplies power to prime movers under varying load conditions.

Figures 5, 6, 7, 9:
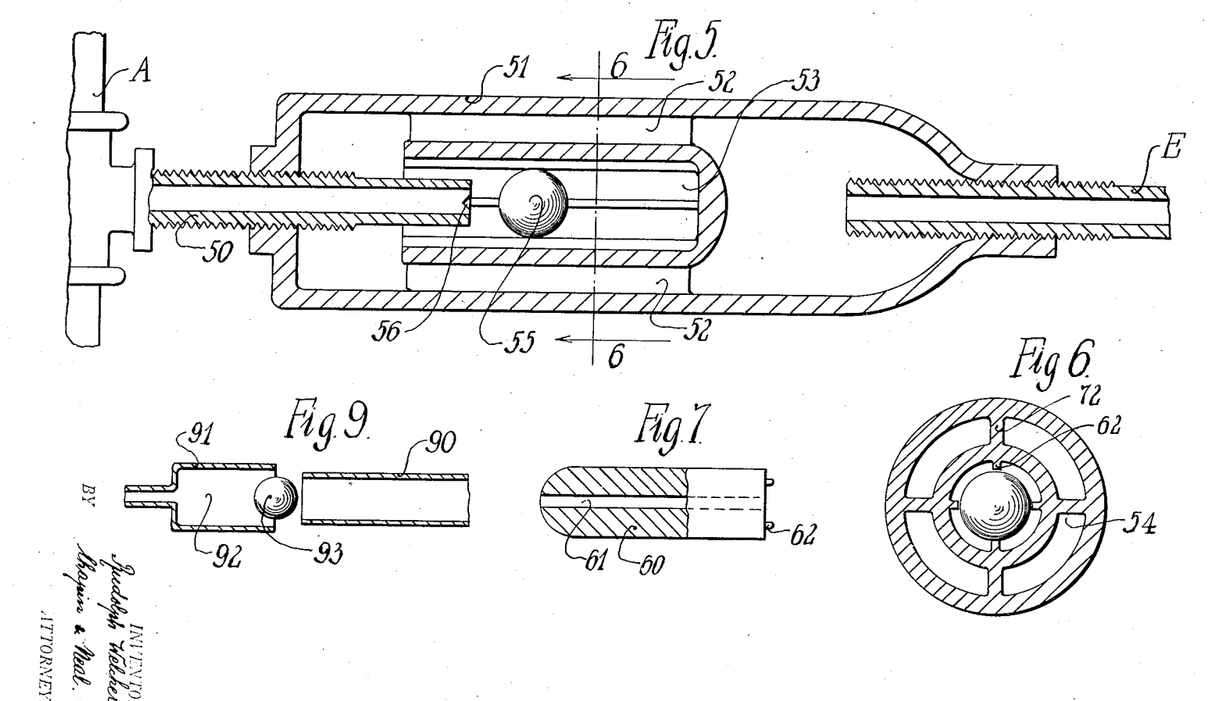
Fig. 5 is a cross-sectional view of a different form of flow governor than shown in the other figures.
Fig. 6 is a section taken on line 6—6 of Fig. 5.
Fig. 7 is a detail view of a means that may be substituted for the ball or a plurality of balls in the pressure chamber.
Fig. 9 is a view of a form of flow governor embodying only the essential elements of the invention—namely, two axially aligned pipes spaced apart, a choking member, and a pressure chamber.

In Fig. 5 there is shown in section a different form of flow governor and with a simple adjustable feature added to it. A threaded stem 50 of an ordinary T-connection to pressure line A serves to adjustably receive the governor casing. The latter has webs 52 supporting the pressure chamber 53 in line with inlet stem 50. The section of the pressure chamber is seen in Fig. 6, preferably but not necessarily provided with ribs 54 to center and guide the ball member 55. By this arrangement of Fig. 5 it is clear that the fluid may enter the governor through stem 50 directly in line with pressure chamber 53 and leave the governor by passing first between the end of stem 50 and the open end of the chamber 53 and then out the annular space surrounding the chamber which is connected to pipe E.

From what has been previously said, it will be understood that under a sufficient velocity from stem 50, ball 55 will move towards the stem. As it thus moves, the flow is gradually choked and the volume from stem 50 gradually cut down. If we assume a sufficient velocity, ball 55 may actually approach so closely to the end of stem 50 as to cut off most of the flow. This action is analogous to the marble in a test tube actually hanging against gravity on the end of a soda water straw through which one blows very hard. To avoid cutting off the flow too much through stem 50, one or more notches 56 may provide for a transverse outlet. This may be desirable to maintain the pressure back of the ball in chamber 53. If the pressure in pipe E is raised for any reason, as by partially shutting off its outlet, of course the velocity from A may drop and the ball will move back toward the dead end of chamber 53.

When the ball is at the dead end of the chamber 53 the flow governor is in condition to pass the maximum volume of fluid so far as its passages are concerned, and when the ball is hanging at the end of stem E the governor is in condition to pass the minimum amount of fluid because its passages are closed as far as they can be in the governing operation. Between these two extremes there is quite a range in which the position of the ball is obstructing or choking the flow much as the hand would obstruct the flow as it approaches and recedes when held against the stream from a hose.

It will be particularly noted that in this form of the governor the ball is not choking the flow by more or less covering ports apart from the inlet port to the governor. The ball is working in direct relation with the inlet port to the pressure chamber 53, rather than its outlet port, as in the other form.

The advantage of this relation is that the inlet velocity is not attentuated by passage across the outlet ports as in Fig. 1. Thus the ball 55 may be brought closer to the end of the stem 50 with less velocity in the flow, and the range of choking action is increased.

The fluid passage from stem 50, as shown in Fig. 6, is directly into the pressure chamber 53 and then back through the annular space between the stem and the overlapping open end of the pressure chamber. This is a tortuous path and it can be given a more or less retarding effect according to the relative position of stem 50 and the open end of chamber 53. To change this relation and to also effect the operation of the ball 55 (because anything affecting the velocity from stem 50 tends to affect the movement of the ball) the governor is adjustably mounted. As shown, the governor is threaded on stem 50 at one end and on branch pipe E at the other end, so that it can be adjusted to and from pipe A. When it is moved toward pipe A there is a greater overlap of chamber 53 with stem 50 and the tortuous path is lengthened. When the governor casing is moved in the other direction the path is shortened. And if the governor is moved far enough away so chamber 53 does not overlap, the fluid path from the stem is not bent back and forth upon itself through the governor but has a direct sidewise communication to the space around chamber 53. This relative adjustment brings factors into play directly useful in influencing the operation of the ball. Instead of a mere adjustment of parts it is an adjustment of function and is of considerable importance.

The governor shown in Fig. 5 could be supplied with ports through the side walls of chamber 53 to cooperate with the ball as described in connection with Fig. 1. But no such ports are shown, since it is desired to emphasize the differences between the form of Fig. 5 and that of Fig. 1. It is clear, however, that one could either omit such ports as in the form shown or, by providing such ports, combine the features of the governor in Fig. 1 with the features of the governor in Fig. 5 to a substantial extent.

Fig. 7 shows a device that might be substituted for the ball in the pressure chamber in either Fig. 1 or Fig. 6. It is characterized by a rounded head and cylindrical shape. The head end would point toward the inlet; the cylindrical body can be long enough to add sufficient weight to the movable member to lessen the tendency to quick vibratory motion such as a ball might have. This form is adapted to more effectively overlap side ports in the pressure chamber as in Fig. 1. A series of knobs 62 would prevent a flush seating of cylinder 60 when pushed against the dead end of the pocket 53 if used in the governor of Fig. 5.

An important feature of the device shown in Fig. 7 is the axial opening 61 throughout its length. If one considers the ball 55 of Fig. 5 replaced by the cylinder 60 of Fig. 7, it is clear that the kinetic energy of the flow through stem 50 would be more directly transmitted through the opening 61 of the cylinder than around the ball. Thus the pressure back of the choke member in pressure chamber 53 would be built up quickly and to a larger degree. The operation of the flow governor depends directly on such back pressure for moving the choke member into choking position. The greater the range of the back pressure, the greater the range of the governor. The cylindrical member with the central bore is designed to increase such range.

If the ball choke member operates in a liquid, it is less likely to move back and forth too quickly than if it is in a gas. The cylinder 60 may be guided in the pressure cylinder as by ribs 54 (see Fig. 6) with little friction, and it is particularly useful in operating with a gas flow governor.

Figure 8:
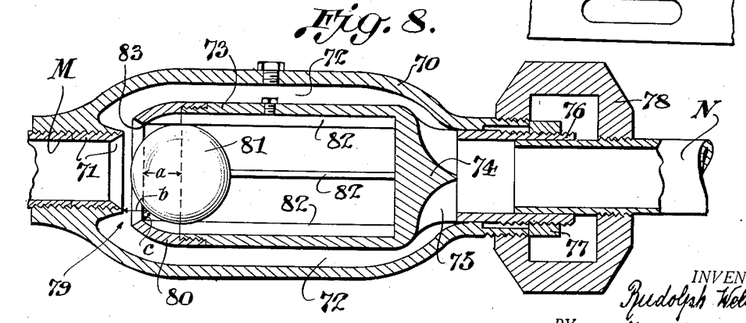
Fig. 8 shows a modified and refined form of the flow governor embodying the invention.

In Fig. 8 there is shown in section a still further form of flow governor with refinements not previously disclosed. The pressure inlet pipe M has casing 70 threaded on it with provision for a valve seat ring 71 as shown. Radially disposed ribs 72 integral with the casing provide means for receiving a pressure cylinder 73 from the large end of casing 70. This cylinder is open at one end and in line with inlet pipe M. The other end is closed by wall 74 and provided with integral spider supports 75 which connect an extended threaded pipe fitting cylinder 76. The exterior of this fitting is threaded to receive a nut 77 adapted to abut the adjacent end of casing 70. This nut may be turned to draw pressure cylinder 73 away from valve seat 71 or the nut may be turned back and then with cylinder 76 pushed forwardly to carry the pressure cylinder toward valve seat 71. In this operation cylinder 76 slides on the end of pipe N and the cylinder 73 slides on ribs 72. Thus the open mouth of pressure cylinder 73 is adjusted with respect to its distance from valve seat 71. The importance of this will appear.

A pipe union 78 is threaded on pipe N and to the adjacent end of casing 70. The union encloses cylinder 76 and nut 77 so that when the described adjustment of pressure cylinder 73 is made and the union screwed in place there is no way to interfere with such adjustment.

The fluid flow through the governor will be from pipe M, the annular space 79 between the end of cylinder 73 and the valve seat, the space between the cylinder 73 and the casing 70, between ribs 72 and 75, and to pipe N. The exterior of the rear wall 74 of pressure cylinder 73 is made stream line in form to facilitate the flow into pipe N.

The open end of cylinder 73 is provided with a readily replaceable nozzle ring 80. The exterior surface of this nozzle is made with a curve to correspond with the curve of the opposite interior wall of casing 70. The interior nozzle wall adjacent the end is also made to generally correspond with the opposite interior wall of casing 70 as it bends down to join valve seat outlet 71. Thus the reverse flow adjacent and through annular space 79 as shown is substantially a stream line flow.

The interior surface of the nozzle 80 is curved inwardly from the cylindrical interior of cylinder 73 towards valve seat 71. The curve shown is preferably a parabolic one and its extent generally corresponds with a small arc of the surface of ball 81 contained in cylinder 73. The latter has interior longitudinal ribs 82 to center and guide the ball 81 and keep it spaced slightly from the walls of the cylinder.

With the structure shown, assume a high pressure flow from pipe M. The flow is directed into the open end of cylinder 73. The opposite end is closed. A pressure is created back of the ball 81. When the effect of such pressure is larger than the effect of the pressure on the front of the ball (which will be the case when the flow velocity is sufficient) the ball will move towards valve seat 71. As it approaches, the pressure on its front face increases. When, for example, it reaches the position shown in Fig. 8, the difficulty of creating and maintaining sufficient pressure back of the ball by a given pressure head in pipe M to move the ball further is increased. This difficult is particularly noticeable when the size of pipe M nearly approaches the diameter of the ball. As shown, the ball is only slightly larger than the pipe. This relationship of the size of ball 81 to pipe M in the governor is made so that the governor may be more nearly pipe size. That is to say, for a given pipe M the governor is desirably about as small as it can effectively be made. An important feature of the governor type shown in Fig. 8 is the arrangement by which the pressure back of ball 81 is made sufficient to move the ball further toward the valve seat when it is close to the valve seat and particularly while the outlet passage 79 is open and passing the flow from pipe M.

This feature involves the shape of nozzle 80. It will be seen as the ball moves from the position shown toward valve seat 71 the following effects are accomplished by the structure shown. The forward surface of the ball progressively narrows the annular opening C between it and the adjacent parabolic surface of the nozzle. The flow from pipe M being diverted on the front of the ball is smoothly directed by the ball surface towards said annular opening C. Because the cylinder 73 is already full, the flow must turn back from such opening C and in its reverse flow pass through annular passage 79. But its energy is applied over the annular area C between the ball and nozzle. As this area is lessened by the ball's movement towards valve seat 71 the tendency towards a flow velocity through it from pipe M is increased. The resultant pressure is increased and applied to the fluid in cylinder 73 and the pressure back of ball 81 is increased to move the ball further toward valve seat 71. When the diameter of the ball substantially coincides with the plane of circle 83 which is at the end of the parabolic curve at the nozzle mouth or just beyond this point, the ball can move no further since the pressure back of the ball is then released through the outwardly flaring nozzle end.

This consideration of maintaining and increasing the pressure within chamber 73 by means of the nozzle construction and its relation to valve seat 71 may be assisted from the following: It is common experience that the act of pinching a nozzle opening through which a flow is taking place will increase the velocity of flow as by squirting water from the end of a hose. If we reverse conditions and establish means by which water is tending to flow into a hose (as the fluid tends to flow into cylinder 73 from pipe M) and then pinch the nozzle through which the inflow is tending just as we would pinch it for the outflow, the tendency toward increase in inflow velocity is increased. If the hose is already full as cylinder 73 is full this tendency towards increased velocity is evidenced by increased pressure. This is the pressure which is made useful in chamber 73. In the governor the actual flow takes place out annular space 79 but only after it impinges in concentrated form on the area C established between the ball 81 and its nozzle walls. This area, through which the energy of the flow is exerted to drive inwardly, being already occupied by liquid, with a dead end backing, causes the flow to reverse its direction and turn back into the only possible outlet through passage 79. But the impact necessary to reverse the flow has been absorbed by the fluid back of ball 81 and is evidenced by back pressure which is applied to the entire rear face of ball 81. Since the front face of the ball presents a pressure area with differential characteristics due to the entirely different conditions of the flow on such face, the ball is unbalanced and moves for the useful purposes of the governor.

It should now be clear that ball 81 can be made to move along the distance "a" in Fig. 8 being influenced in such movement by the particular nozzle construction. The nozzle 80 is shown as removable from the end of cylinder 73 with the idea that the nozzle construction or surfaces may be changed to affect the operation of the governor under different conditions while the rest of the governor may remain the same. Such variation in nozzles is within the scope of the invention since it is made clear from what has been said (for example the progressive "pinching" of distance C through the distance "a" and the variation by different nozzles of C and "a") that various effects can be obtained by changes in the nozzle.

The idea by which the cylinder 73 and its nozzle is set (in the form shown by means of adjustment of cylinder 73) with a particular relation to valve seat 71 is also important. If the setting is, so that distance "a" is equal to distance "b" then the ball 81 can be brought to the valve seat 71. But it will not seat tightly for the reason that the velocity of the pinched flow from pipe M is necessary to bring it approximately to the seat and hold it there.

An important feature of the arrangement shown is obtained by setting the nozzle 80 so that distance "b" is sufficient for the ball to reach its limit of movement in the nozzle (when the ball center is in circle 83) while it is still spaced from valve seat 71 the amount desired for the minimum flow from pipe M. This setting is adjustable in the form shown in Fig. 8. By this means a substantial passage through the governor between the ball and valve seat 71 may always be open. The range of choking action for the flow is determined by the nozzle formation or by distance "a" or by both. The relation of "a" to "b" can be set as desired. If it is desired to vary the character of flow through the governor, its outlet port may be choked through the same range "b" and the nozzle changed in character (as by lengthening distance "a" through a substitution of another nozzle) to determine how and when the outlet shall be choked. As previously stated, the outlet port may be enlarged or diminished by adjusting cylinder 73 which will vary distance "b".

All these features make the governor of Fig. 8 capable of working through wider ranges and more conveniently than the other forms shown.

Various practical applications will suggest themselves. For example, the flow governor may be used in a pressure line regardless of its pressure head and will hold the velocity from mounting beyond desirable limits. The flow governor may be placed between sections of a long pressure line and protect the line against the excess velocity that would do damage to the line. When branch lines extend from a high pressure line or from a header member, my governor is useful in providing for a proper velocity in any single branch line. It is also useful in preventing one branch line "robbing" other branch lines when all are fed from a common source and some are more favorably situated for feeding purposes than others. This is often true in plumbing systems as in a house where one faucet when open will result in other faucets not running as desired. My governor in its simple form is only slightly more costly to make than a simple T-pipe connection. By substituting the governor for each branch line T-connection there will be no difficulty due to excess velocity in one pipe at the expense of the feed velocity in the other pipes. The low cost of the governor will make it available in many such places where now no apparatus such as ordinary pressure governors can be used because of its expense. But probably the most important use of the governor will be as a frictionless device in controlling the flow to prime movers such as turbines, air compressors, and steam engines.

In Fig. 9 a form of governor is shown embodying only the bare essentials of the invention. The flow is from conduit 90 to the axially aligned conduit 91. The two are spaced apart. By constricting the flow (or by closing the end or substantially closing the end) through conduit 91 and forming the latter (but not necessarily the conduit 90) like a pipe, a pressure chamber 92 is established. The flow from 90 generates a pressure in chamber 92 in proportion to the flow. The choke member 93 (a ball or other suitable form) is mounted for back and forth axial displacement with respect to the conduits. By such displacement the flow from 90 is governed.

The fundamental relationship in the parts of my velocity governor are broader than may appear from the specific illustration. This relationship is found in the capacity of the movable element of the control (specifically shown as a ball) to function with relation to the fluid velocity alone and by the movement of such element to control such velocity. The automatic control of a pipe line flow is conventionally imposed by external force or by opening and closing more or less an outlet by and according to the static pressure of the fluid working through a pressure governor. In my device, however, the dynamic pressure of the flow is directly applied to the movable element in the governor itself whereby such element is brought into position without the need of other operating mechanism to control the flow. It gives among other facilities a velocity control beyond the control of the service pressure in the conduit.

I have disclosed the improved structure in various forms and the mode of operation of such forms to comply with the patent statutes. I desire to claim the invention as broadly as the prior art permits, in addition to claiming specific features of advantage with relation to the broad conception.

1. A flow governor to control fluid velocity in a conduit comprising a casing having inlet and outlet ports, a pressure chamber in line with the inlet port to convert dynamic pressure into static or back pressure, a member in the casing free to move from the pressure chamber to a throttling position to retard the flow between said inlet and said outlet ports, said member being located so as to be subjected to a tendency to move in the pressure chamber away from said position under the dynamic pressure through the inlet port and under static pressure in the chamber toward said throttling position.

2. A flow governor comprising an inner and an outer cylinder mounted coaxially and adjustably longitudinally one with respect to the other, the outer cylinder having an inlet shaped like a valve seat and the inner cylinder having a normally open nozzle adjacent the inlet, said cylinders providing a reverse flow passage from the inlet to the space surrounding said cylinders, a curved surface choke member loosely mounted in the inner cylinder and of a diameter about equal to the nozzle diameter and slightly larger than the inlet, said inner cylinder having its end opposite the nozzle closed, whereby the velocity of the flow may create a pressure back of the choke member greater than the pressure on the front of the choke member and bring the latter toward the inlet to cut down the volume of flow from the inlet.

3. A flow governor comprising a pipe section having an inlet smaller than its diameter, a coaxial pressure cylinder slightly smaller than the pipe section and slightly larger than the inlet, said cylinder having an open end spaced far enough from said inlet to provide for flow through the governor, said open end being in the form of a nozzle whose walls change from its open end to meet the walls of the pressure cylinder, and a loosely mounted choke member having a ball-like forward end.

4. In a flow governor of the type described a pressure cylinder having one end closed and one end open with a nozzle at the latter end, a choke member having a curved forward surface, the interior surface of said nozzle having a form to cooperate with the curved surface of the choke member whereby as the latter approaches the end of the nozzle the annular space between the choke member and nozzle will be gradually lessened, said pressure cylinder being proportioned relatively to the choke member so that the pressure generated therein due to the flow from the nozzle will move the member toward the nozzle as the velocity of flow increases.

5. A flow governor comprising a casing having an inlet for flow through the governor, a pressure cylinder closed at one end and open at the other, said open end being in line with and adjacent to said inlet, a choke member in the pressure cylinder adapted to be positioned by the differential pressures on its front and rear faces, a nozzle at the open end of the pressure cylinder shaped to cooperate with the outer face of the choke member as it approaches said inlet to progressively affect the differential pressure relation on the choke member during such approach, said pressure cylinder being proportioned relatively to the choke member so that the latter is moved toward the nozzle as the velocity of flow increases.

6. A pipe line control device comprising a casing for making a union between two pipe members, said casing having an inlet passage and an outlet passage with normally open passage between the two and pressure operable means for controlling said passage, said means being movable under normal dynamic pressure of the flow through the casing to clear said passage and lie dormant within a pocket of the casing in line with said flow and being movable under an increased flow creating static or back pressure in said pocket to partially choke said passage.

7. A pipe line control device comprising a casing for making a union between two pipe members, said casing having an inlet passage and an outlet pasage with normally open passage between the two, automatic means operable to vary the area of said open passage, said means including a pocket in the casing arranged to convert a portion of the dynamic pressure of the flow through the casing into static pressure and a movable member located for exposure to the static or back pressure within said pocket on one side and the dynamic pressure on its opposite side, said member being free to move into position to partially choke said open passage and vent said pocket and into position to clear said open passage, which movements are dependent respectively on an abnormal and normal flow velocity through said casing.

8. A pipe line control device comprising a casing for making a union between two pipe members, said casing having an inlet port, an outlet port, a pocket in direct communication with the inlet port and arranged substantially coaxially therewith and a normally free passage between said ports, a ball adapted under the influence of pressures created by the flow to move automatically between said inlet port and said pocket and in such movement vary the exposed area of said passage toward the inlet end.

9. A flow governor comprising two cylinders one within and spaced from the other, the outer cylinder having an inlet in line with the inner cylinder and an outlet passage from the annular space between the cylinders, the inner cylinder being open at the end adjacent said inlet and closed at the end remote from said inlet, a choke member loosely mounted in the inner chamber and arranged to move to different positions under the differential pressure between the velocity of the inlet and the back pressure at the dead end of the inner chamber created by such velocity, said choke member being adapted to cut down the flow between the inlet and outlet by its position as it is forced toward the inlet passage from the dead end of the inner cylinder.

10. The combination of claim 9 characterized by a choke member having an annular shaped cross-section.

11. The combination of claim 9 characterized by the inlet being smaller in cross-section than the cross-section of the inner cylinder.

12. The combination of claim 9 characterized by the choke member having a larger cross-section than the inlet.

13. A flow governor comprising a casing having a normally open passage for the flow to be governed, a pressure container having an open end adjacent the inlet for said flow, a choke member normally in said container and adapted to choke the passage through said casing, said choke member presenting surfaces subject to the direct pressure of the flow and subject to the pressure in said container created by the flow, said container having a nozzle at its open end shaped to cooperate with the surface of the choke member and affect the differential pressure effect of the flow on the choke member whereby the latter is positioned as it moves to choking position for the flow under such differential pressures, said pressure container being proportioned with relation to the choke member so that the latter is moved against the flow as the velocity of the flow increases.

14. A flow governor comprising a casing having an inlet opening, a pressure chamber with direct communication in line with the inlet, and an outlet passage between the pressure chamber and the inlet opening, a movable member for controlling the outlet passage and arranged to be urged into said pressure chamber by the dynamic pressure of the flow applied directly to said member and out of the pressure chamber toward the inlet passage by back pressure therein due to the flow as the velocity of the latter increases, whereby the movable member is positioned with relation to the outlet passage by the velocity of the flow.

15. A flow governor comprising an outer and inner casing between which the flow to be governed may pass, the inner casing having a closed end on the low pressure side and an open end on the high pressure side in direct line with the inlet flow to the governor, a choke member in the inner casing free to move between its ends like a loose piston with an annular passage between it and the casing walls, said choke member having a front end to divert the flow towards said annular passage, an annular passage between the open end of the inner cylinder and the outer casing, said choke member being adapted by differential pressures on its front and rear surfaces to move into and out of choking relation to the flow through the casing.

16. A flow governor comprising an outer casing with an inlet and an outlet, an inner casing closed at one end and open at the other end adjacent the inlet to the outer casing so as to make an annular passage for the flow, means to adjust one of said casings to change the amount of said annular passage, a choke member in the inner casing formed to receive differential pressure effects due to the flow from said inlet, whereby the choke member is moved into and out of choking position between the inlet and said annular passage.

17. A flow governor comprising two axially aligned conduits spaced apart, a choking member adapted to be positioned within this space by back and forth axial displacement, and means including a pressure chamber within one of said conduits within which flow from the other conduit may generate a pressure for said displacement of the choke member in proportion to said flow.

18. A fluid control device for preventing excess velocity of flow in a conduit, said device having a movable member immediately responsive to excess velocity, a main flow passage the area of which may be varied by the movable member, and a fluid pressure pocket positioned to receive within its walls the impact of the velocity flow from the main passage and to directly apply the pocketed fluid pressure to the movable member and automatically position it in response to the value of the velocity, said parts being proportioned and positioned for the movable member to automatically counteract the tendency toward excess velocity by movement in opposition to the main flow without closing either the main flow passage or said pocket whereby the said member may be free to move at all times under the combined influence of the flow velocity value and the pocketed fluid pressure generated thereby, both acting directly on opposite sides of the said movable member.

19. A velocity control device for a fluid conduit, said device having a movable member immediately responsive to the tendency toward excess velocity in the fluid, a main flow passage in axial alignment with the movable member and a fluid pressure pocket in line to receive within its walls the impact of the velocity flow from the main passage and to directly apply the pocketed fluid pressure to one side of the movable member, the other side of said movable member being directly opposed to the flow and tapered sufficiently to divert a substantial part of the velocity impact on that side into the fluid pressure pocket, whereby the pressures on the opposite sides of the movable member are unbalanced when the velocity value of the flow changes, said movable member being large enough to decrease the velocity in the main flow passage when moved thereto by the difference in the pressures applied to its opposite sides.

20. A velocity control device comprising a casing with an inlet port, a pressure pocket member with an open end larger than and in line with said port, a floating member of less diameter than the pocket and larger than the inlet port and free to move between the two under the sole control of the pipe line pressure, the inlet port, pressure pocket, and floating member having coordinated means to divide the flow from the inlet port, apply the impact force of this flow to the fluid in the pressure pocket to a substantially larger degree than to the end of the floating member opposed to the flow whereby said member may be forced by the pressure in the pocket member to cut down the flow until the pressure on its opposite sides balance.

21. A fluid control device for preventing excess velocity of flow in a conduit, said device having a movable member primarily responsive to the value of the velocity, a main flow passage the area of which may be varied by the movable member, and a fluid pressure pocket positioned to receive within its walls the impact of the velocity flow from the main passage and to directly apply the pocketed fluid pressure to the movable member, the whole device being constructed so as to apply the pressure, generated in the pocket by the tendency of excess velocity, to the movable member and to thus position it for decreasing the area of said main flow passage through the device.

22. A fluid control device for preventing excess velocity of flow in a conduit, said device having a movable member with an arch-shaped end portion pointed against the flow and primarily responsive in movement to the value of the flow velocity, a main flow passage the area of which may be progressively varied by the movable member, and a fluid pressure pocket positioned to receive within its walls the impact of the velocity flow and to apply the pressure generated thereby to the movable member, the whole device being constructed so as to apply the pressure generated in the pocket by the tendency of excess velocity to the movable member and to then position it for decreasing the area of said main flow passage through the device.

23. A fluid control device for preventing excess of flow in a conduit, said device including a pressure pocket having its open end directed against the flow, a main flow passage through the device with an inlet port opposite the open end of said pocket, a movable flow retarding member located in said pocket with an arch-shaped end portion pointed toward the inlet port, the relative areas and positions of the inlet port and the end portion of the retarding member being constructed to minimize the impact force of the flow velocity on said member and to apply that force to the fluid in the pressure pocket toward the rear of the retarding member so as to create a pressure there which will push the member directly against the stream flow and retard the velocity at the inlet passage.

24. A velocity control device for pipe lines, said device having a flow retarding member submerged in the stream line, a pressure chamber arranged axially in the stream line to receive said member loosely and with an open end to receive the impact of the velocity flow, said member being freely movable back and forth within the chamber but spaced sufficiently from its walls to permit the transmission of said impact through the space between, the front surface of the member being tapered sufficiently to increase said transmission and of sufficient size to retard the flow when moved thereto by the pressure in the chamber generated by sufficient impact force from the flow, an inlet port in line with the pressure chamber and proportioned with respect to the front surface of the retarding member for the latter to hold down the volume of the flow from the inlet port when its velocity tends to rise above a predetermined range and sufficiently to bring the retarding member out of the pressure chamber into cooperation with the inlet port, said device being characterized by the constant application of the velocity impact from the flow to the pressure chamber and the freedom of the retarding member to respond in movement to the value of the velocity alone and independently of the static head in the line.

25. A flow governor comprising a casing with a flow passage therethrough, rolling means in said passage automatically responsive to a predetermined excess velocity flow or tendency to such flow through the casing, stationary means in the casing to cooperate with said rolling means according to the position of the latter, in throttling the flow to approximately its predetermined amount, said flow passage being arranged so as to prevent said cooperating means from completely shutting off the flow.

26. A flow governor for controlling the velocity of a fluid stream so as to make the flow substantially independent of excess static head, comprising a casing having a fluid passage therethrough, a pressure chamber in the casing to automatically measure the velocity energy of the flow by converting a portion thereof into potential energy, and rolling means automatically movable by said potential energy to throttle the fluid passage whenever the flow tends to exceeed a substantially predetermined velocity.

27. A flow governor for controlling the velocity of a fluid stream so as to make the flow substantially independent of any excess static head, comprising a casing having a fluid passage therethrough, a pressure chamber associated with said passage to automatically measure the velocity energy of the flow by converting a portion thereof into potential energy, and a choke ball automatically movable by said potential energy to throttle the fluid passage to an increasing amount whenever the flow tends to exceed a substantially predetermined velocity, said choke ball being also automatically movable by the velocity energy of the stream to throttle the fluid passage to a decreasing amount whenever the flow tends to fall below the same predetermined velocity.

In testimony whereof I have affixed my signature.

RUDOLPH WELCKER.